US009229596B2

(12) United States Patent
Kang et al.

(10) Patent No.: US 9,229,596 B2
(45) Date of Patent: Jan. 5, 2016

(54) TOUCH SCREEN PANEL HAVING SENSING CELLS AND COUPLING PATTERNS

(71) Applicant: Samsung Display Co., Ltd., Yongin, Gyeonggi-Do (KR)

(72) Inventors: Sung-Ku Kang, Yongin (KR); Jung-Yun Kim, Yongin (KR); Mi-Ae Park, Yongin (KR)

(73) Assignee: Samsung Display Co., Ltd., Giheung-Gu, Yongin-si, Gyeonggi-Do (KR)

( * ) Notice: Subject to any disclaimer, the term of this patent is extended or adjusted under 35 U.S.C. 154(b) by 85 days.

(21) Appl. No.: 14/138,598

(22) Filed: Dec. 23, 2013

(65) Prior Publication Data

US 2014/0253495 A1 Sep. 11, 2014

(30) Foreign Application Priority Data

Mar. 7, 2013 (KR) ........................ 10-2013-0024309

(51) Int. Cl.
*G06F 3/044* (2006.01)

(52) U.S. Cl.
CPC ...... *G06F 3/044* (2013.01); *G06F 2203/04111* (2013.01)

(58) Field of Classification Search
CPC ................. G06F 3/041–3/047; G06F 3/0202; G02F 1/13338
USPC ................................. 345/173, 174; 178/18.06
See application file for complete search history.

(56) References Cited

U.S. PATENT DOCUMENTS

| 8,217,902 | B2 | 7/2012 | Chang et al. | |
|---|---|---|---|---|
| 2006/0017708 | A1* | 1/2006 | Fukui et al. | 345/173 |
| 2008/0309635 | A1 | 12/2008 | Matsuo | |
| 2010/0123670 | A1* | 5/2010 | Philipp | 345/173 |
| 2010/0156840 | A1* | 6/2010 | Frey | G06F 3/044 345/174 |
| 2011/0267308 | A1* | 11/2011 | Park et al. | 345/174 |
| 2011/0310037 | A1* | 12/2011 | Moran | G06F 3/0412 345/173 |
| 2012/0081334 | A1* | 4/2012 | Kim et al. | G06F 3/044 345/174 |
| 2012/0140392 | A1* | 6/2012 | Lee | G06F 3/044 361/679.01 |
| 2013/0000952 | A1* | 1/2013 | Srinivas | H01B 1/02 174/126.1 |
| 2013/0314625 | A1* | 11/2013 | Tsai et al. | 349/12 |

FOREIGN PATENT DOCUMENTS

KR 10-2008-0110477 12/2008

* cited by examiner

*Primary Examiner* — Larry Sternbane
(74) *Attorney, Agent, or Firm* — Robert E. Bushnell, Esq.

(57) ABSTRACT

There is provided a touch screen panel in which sensing cells as touch sensors are formed on one surface of a substrate. The sensing cells are realized by laminating transparent conductive layers and mesh-shaped opaque metal layers. Therefore, uniform distribution of an electric field may be secured when a large area touch screen panel is realized and an operation may be performed although short is partially generated in the mesh-shaped opaque metal layers.

12 Claims, 3 Drawing Sheets

TOUCH SCREEN PANEL HAVING SENSING CELLS AND COUPLING PATTERNS

CLAIM OF PRIORITY

This application makes reference to, incorporates the same herein, and claims all benefits accruing under 35 U.S.C. §119 from an application earlier filed in the Korean Intellectual Property Office on 7 Mar. 2013 and there duly assigned Serial No. 10-2013-0024309.

BACKGROUND OF THE INVENTION

1. Field of the Invention

The embodiments of the present invention relate generally to a touch screen panel, and more particularly, to a touch screen panel in which uniform distribution of an electric field may be secured when a large area touch screen panel is realized and an operation may be performed even when short is partially generated in the mesh-shaped opaque metal layers.

2. Description of the Related Art

A touch screen panel is an input device capable of selecting the indication content displayed on the screen of an image display device by a human hand or an object to input the command of a user.

Therefore, the touch screen panel is generally provided on the front face of the image display device to convert a contact position of the human hand or the object into an electrical signal. Therefore, the indication content selected in the contact position is received as an input signal.

Since the touch screen panel may replace an additional input device coupled to the image display device to operate such as a keyboard and a mouse, the application range is gradually increasing.

As a type of implementing the touch screen panel, a resistive type, an optical sensing type, a capacitive type, and the like, are known. Among them, the capacitive type touch screen panel converts a touch input into an electrical signal, when a conductive sensing electrode senses a change in the capacitance formed with other adjacent sensing patterns or ground electrodes, or the like, by contacting with a user's hand or an object.

The above information disclosed in this Background section is only for enhancement of understanding of the background of the described technology and therefore it may contain information that does not form the prior art that is already known in this country to a person of ordinary skill in the art.

SUMMARY OF THE INVENTION

Embodiments of the present invention provide a touch screen panel in which sensing cells as touch sensors are formed on one surface of a substrate. The sensing cells are realized by laminating transparent conductive layers and mesh-shaped opaque metal layers. Therefore, uniform distribution of an electric field may be secured when a large area touch screen panel is realized and an operation may be performed although short is partially generated in the mesh-shaped opaque metal layers.

An embodiment of the present invention relates to a touch screen panel, including a substrate, first sensing cells formed on the same surface of the substrate and arranged in a first direction and second sensing cells arranged in a second direction that intersects the first direction, and first coupling patterns for coupling the first sensing cells in the first direction and second coupling patterns for coupling the second sensing cells in the second direction. The first and second sensing cells are realized by laminating transparent conductive layers and mesh-shaped opaque metal layers.

The transparent conductive layers are formed of one of indium tin oxide (ITO), carbon nanotube (CNT), and graphene. The opaque metal layers may be formed of at least one low resistance metal of Ag, Al, Cu, Cr, and Ni.

The transparent conductive layers are patterned on the substrate. The mesh-shaped opaque metal layers are formed on top surfaces of the patterned transparent conductive layers in frames of the patterned transparent conductive layers.

The substrate as a low retardation film may be formed of one of a casted polycarbonate (PC) film and a cyclic polyolefin (COP) film. The substrate may be formed of one of a PC film, an oriented poly propylene (OPP) film, and a poly vinyl alcohol (PVA) film having a phase difference function.

Colored photoresists may be further formed on regions that overlap the opaque metal layers of which the first and second sensing cells are formed.

The first coupling patterns may be formed in a form of bridges and the second coupling patterns are integrated with the second sensing cells.

Each of the first coupling patterns may include a first bridge pattern formed of a transparent conductive material with a first width and a second bridge pattern laminated on the first bridge pattern and formed of an opaque metal with a second width.

An island-shaped insulating layer is formed on one surface of the first coupling pattern with a lamination structure of the first and second bridge patterns so that both ends of the first coupling pattern are exposed. A length of the insulating layer is smaller than that of the first bridge pattern and a width of the insulating layer is larger than that of the first bridge pattern.

Both ends of the first coupling pattern contact protrusions of adjacent first sensing cells.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE INVENTION

Hereinafter, the embodiments of the present invention will be described in detail with reference to the accompanying drawings.

Figure 1:
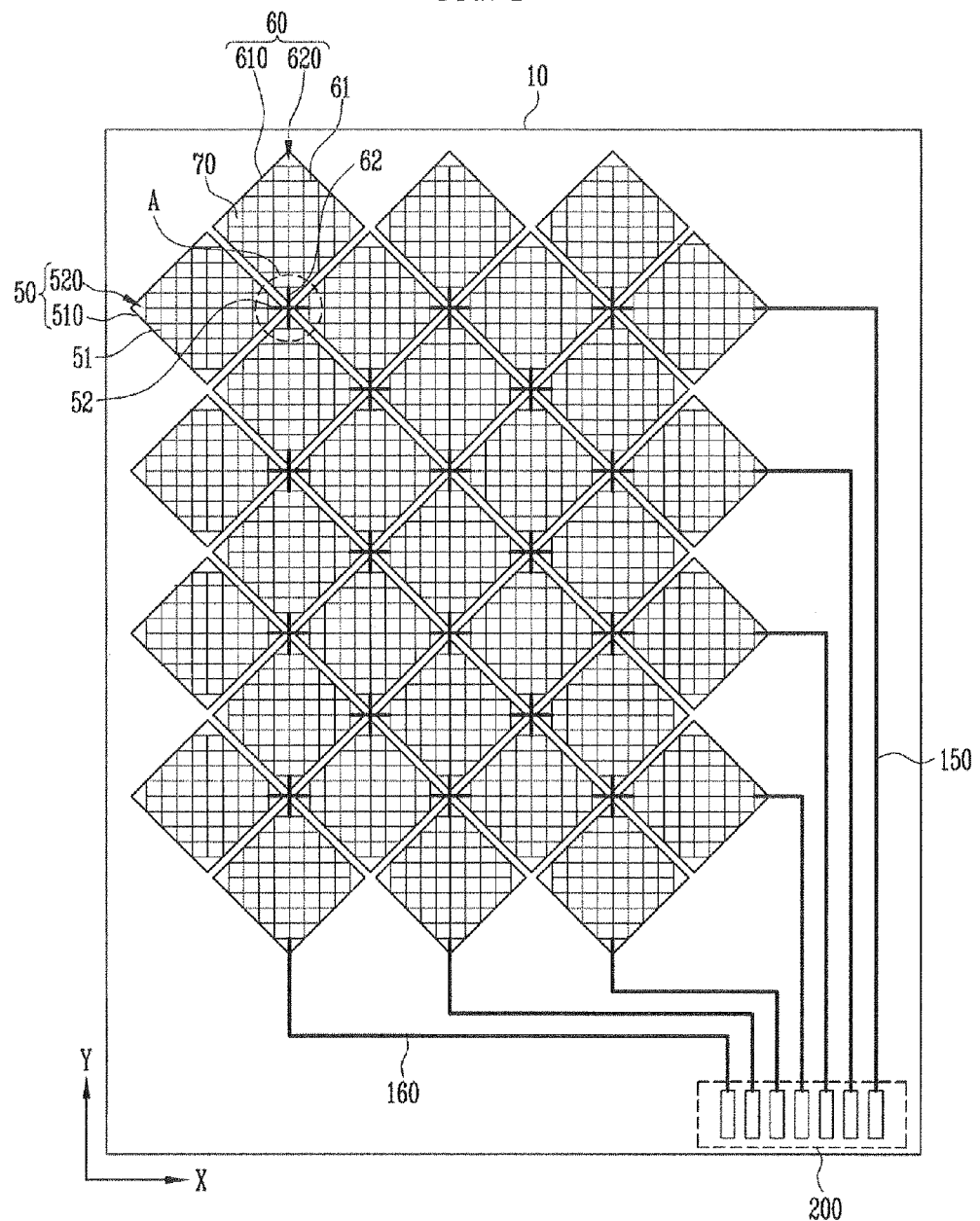
FIG. 1 is a plan view illustrating a touch screen panel according to an embodiment of the present invention.

FIG. 1 is a plan view illustrating a touch screen panel according to an embodiment of the present invention.

In reference to FIG. 1, a touch screen panel according to an embodiment of the present invention includes a substrate 10, first and second sensing cells 50 and 60 formed on one surface of the substrate 10, and first and second position detecting lines 150 and 160 for coupling the first and second sensing cells 50 and 60 to an external touch driving circuit (not shown) through a pad unit 200.

As illustrated in FIG. 1, the first sensing cells 50 are longitudinally formed in a first direction (for example, an X axis direction) to be arranged in a second direction (for example, a Y axis direction) that intersects the first direction.

In addition, the second sensing cells 60 are longitudinally formed in the second direction to be arranged in the first direction.

The sensing cells 50 and 60 according to the embodiment of the present invention are realized by laminating transparent conductive layers 510 and 610 and mesh-shaped opaque metal layers 520 and 620.

At this time, the transparent conductive layers 510 and 610 may be formed of one of indium tin oxide (ITO), carbon nanotube (CNT), and graphene and the opaque metal layers 520 and 620 may be formed of a low resistance metal such as Al, Cu, Cr, and Ni.

In a contemporary art, the sensing cells are realized by a single layer of a transparent conductive material or a mesh-shaped opaque metal.

At this time, when the sensing cells are realized by the single layer of the transparent conductive material, signal delivery is delayed due to large surface resistance of the transparent conductive material. The signal delivery may be delayed more as an area of the touch screen panel is increased.

In addition, in a case of a flexible touch screen panel where the substrate 10 has a flexible characteristic, when the flexible touch screen panel is curved or folded, crack is generated in the sensing cells formed of the transparent conductive material so that a defective operation is caused.

In order to solve the problem, the sensing cells may be formed of a mesh-shaped ductile opaque conductive material. In this case, a smaller amount of crack is generated in the mesh-shaped ductile opaque conductive material than in the transparent conductive material such as ITO and the mesh-shaped ductile opaque conductive material has higher electrical conductivity than that of the transparent conductive material such as ITO. However, when a large area touch screen panel is realized, it is difficult to secure uniform distribution of an electric field.

In addition, when short is partially generated in the mesh-shaped opaque metal layer of which the sensing cells are formed, a sensing operation may not be performed.

According to the embodiment of the present invention, as illustrated in the drawing, the sensing cells 50 and 60 are realized by laminating the transparent conductive layers 510 and 610 and the mesh-shaped opaque metal layers 520 and 620 so that the uniform distribution of the electric field may be secured when the large area touch screen panel is realized and an operation may be performed although short is partially generated in the mesh-shaped opaque metal layers 520 and 620.

In addition, the substrate 10 on which the sensing cells 50 and 60 are formed may be formed of glass like in a contemporary art, however, is preferably formed of a material having a flexible characteristic in order to realize the flexible touch screen panel.

For example, the substrate 10 may be formed of a flexible low retardation film such as a cast polypropylene (PC) film and a cyclic polyolefin (COP) film.

The substrate 10 may function as a phase difference film provided in a common polarizing plate. In this case, the substrate 10 may be formed of a PC film, an oriented polypropylene (OPP) film, or a polyvinyl alcohol (PVA) film having a phase difference function.

As described above, according to the embodiment of the present invention, the sensing cells 50 and 60 are realized by laminating the transparent conductive layers 510 and 610 and the mesh-shaped opaque metal layers 520 and 620. As illustrated in FIG. 1, the mesh-shaped opaque metal layers 520 and 620 are formed on the transparent conductive layers 510 and 610 patterned on the substrate 10 in a predetermined form. That is, the mesh-shaped opaque metal layers 520 and 620 are formed in frames of the patterned transparent conductive layers 510 and 610.

In reference to FIG. 1, the transparent conductive layers 510 and the mesh-shaped 51 opaque metal layers 520 that form the first sensing cells 50 are arranged in a first direction and, in the first sensing cells 50 arranged in the same line, adjacent first sensing cells are electrically coupled to each other through the first coupling patterns 52.

The transparent conductive layers 610 and the mesh-shaped 61 opaque metal layers 620 that form the second sensing cells 60 are arranged in a second direction and, in the second sensing cells 60 arranged in the same line, adjacent second sensing cells are electrically coupled to each other through the second coupling patterns 62.

That is, since the opaque metal layers 520 and 620 of the first sensing cells 50 and the second sensing cells 60 are realized in the form of meshes 51 and 61, a plurality of apertures 70 are formed in the opaque metal layers 520 and 620. In FIG. 1, the aperture 70 is square for convenience sake. However, the embodiment of the present invention is not limited to the above.

In addition, the transparent conductive layers 510 and 610 of the first and second sensing cells 50 and 60 may be patterned to be diamond-shaped. However, the shape of the sensing cells according to the embodiment of the present invention is not limited to the above.

According to the embodiment of the present invention, for convenience sake, as illustrated in FIG. 1, the sensing cells 50 and 60 are realized to be diamond-shaped.

In addition, first position detecting lines 150 are coupled to one ends of the first sensing cells 50, second position detecting lines 160 are coupled to one ends of the second sensing cells 60, and the first position detecting lines 150 and the second position detecting lines 160 may transmit signals detected by the sensing cells 50 and 60 to an external touch driving circuit (not shown) through the pad unit 200.

That is, the touch driving circuit that receives the signals through the first position detecting lines 150 and the second position detecting lines 160 may grasp a touch position of a user.

In addition, according to the embodiment of the present invention, the first and second sensing cells 50 and 60 are formed on the same surface of the substrate 10.

As described above, when the first and second sensing cells 50 and 60 are formed on the same surface of the substrate 10, intersections of the first coupling patterns 52 for coupling the adjacent first sensing cells 50 and the second coupling patterns 62 for coupling the adjacent second sensing cells 60 must be electrically insulated.

In FIG. 1, in a region A where the first coupling pattern 52 and the second coupling pattern 62 intersect each other, an insulating layer is not illustrated but only the intersection of the first and second coupling patterns 52 and 62 is illustrated for convenience sake. At least one of the first coupling pattern 52 and the second coupling pattern 62 is not integrated with the sensing cells 50 and 60 but is realized in the form of a bridge with an insulating layer (not shown) interposed.

For example, when the second coupling pattern 62 is integrated with the second sensing cells 60, the first coupling pattern 52 is realized in the form of a separated bridge insulated by the insulating layer formed in a region that overlaps the second coupling pattern 62 that intersects the first coupling pattern 52 to electrically couple the first sensing cells 50 to each other. In one embodiment, the second coupling pattern 62 is formed simultaneously together with the second sensing cells 60 as a single integral and monolithic and continuous structure.

Figure 2A:
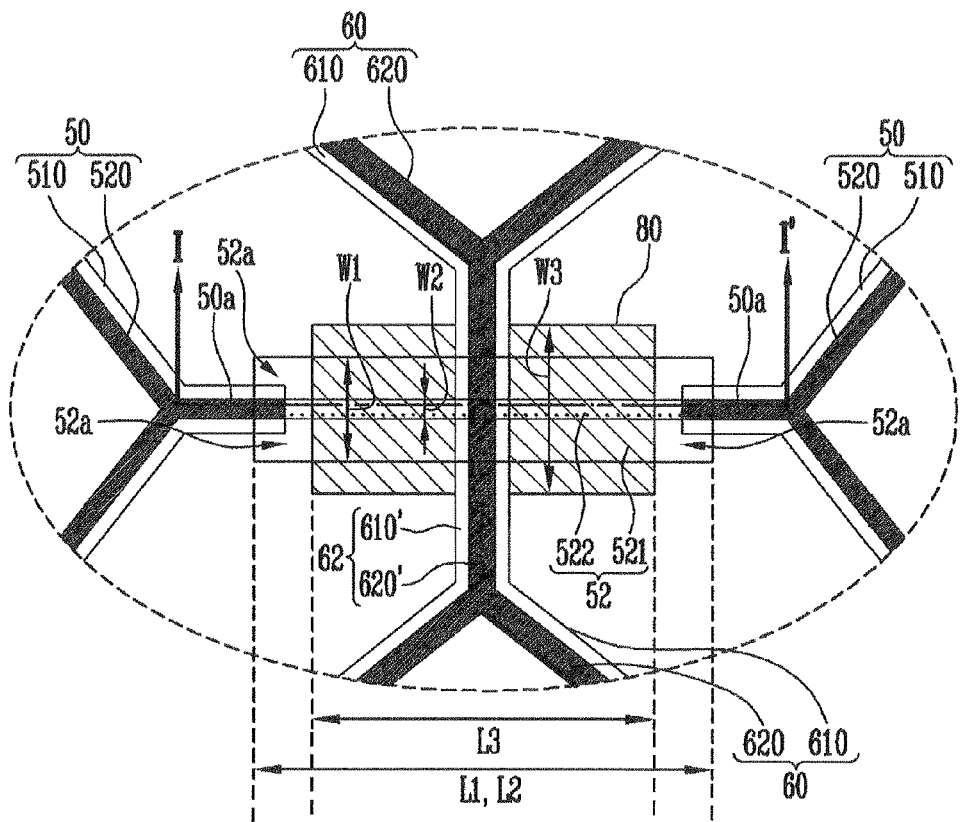
FIG. 2A is an enlarged plan view of a specific region A of FIG. 1.
Figure 2B:
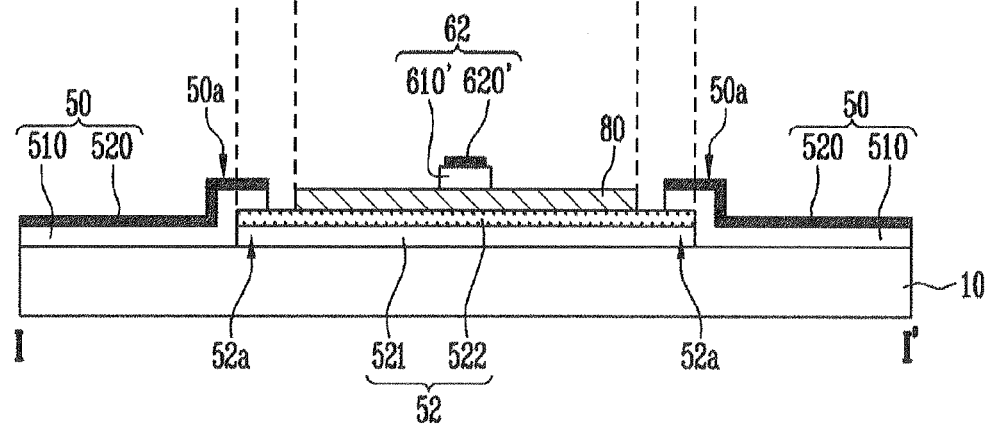
FIG. 2B is a cross-sectional view of a specific region A of FIG. 1 taken along line I-I' of FIG. 2A according to the embodiment of the present invention.

FIGS. 2A and 2B are respectively a plan view and a sectional view of the specific region of FIG. 1, that is, the region A in which the first coupling pattern 52 and the second coupling pattern 62 intersect each other and parts of the first and second sensing cells adjacent to the region A. Hereinafter, the embodiment of the present invention will be described in detail with reference to FIGS. 2A and 2B. FIG. 2B is a cross-sectional view of a specific region A of FIG. 1 taken along line I-I' of FIG. 2A according to the embodiment of the present invention.

In FIGS. 2A and 2B, the second coupling pattern 62 is integrated with the second sensing cells 60 and the first coupling pattern 52 is realized in the form of a bridge. However, the embodiment of the present invention is not limited to the above.

At this time, the bridge-shaped first coupling patterns 52 may be formed of the same material as that of the transparent conductive layer 510 or the opaque metal layers 520 of which the first sensing cells 50 are formed. In addition, like the first sensing cells 50, the first coupling patterns 52 may be realized by laminating the transparent conductive layers 510 and the opaque metal layers 520.

Hereinafter, it is described that the first coupling patterns 52 illustrated in FIGS. 2A and 2B are realized by laminating the transparent conductive layers 510 and the opaque metal layers 520 like the first sensing cells 50. However, the embodiment of the present invention is not limited to the above.

As illustrated in FIGS. 2A and 2B, the first coupling pattern 52 includes a first bridge pattern 521 formed of a transparent conductive material with a first width W1 and a second bridge pattern 522 laminated on the first bridge pattern unit 521 and formed of an opaque metal with a second width W2.

In the embodiment illustrated in FIGS. 2A and 2B, a length L1 of the first bridge pattern 521 is equal to a length L2 of the second bridge pattern 522. However, the above is only an embodiment and the length L2 of the second bridge pattern 522 may be realized to be smaller than the length L1 of the first bridge pattern 521.

In addition, an island-shaped insulating layer 80 is formed on the first coupling pattern 52 formed of the first and second bridge patterns 521 and 522 so that both ends 52a of the first coupling pattern are exposed by the island-shaped insulating layer 80.

At this time, in reference to FIG. 2A, the island-shaped insulating layer 80 may be realized in the form of a rectangle. A length L3 of the insulating layer 80 is smaller than the length L1 of the first bridge pattern 521 and a width W3 of the insulating layer 80 is larger than the width W1 of the first bridge pattern 521.

The insulating layer 80 is not necessarily realized in the form of a rectangle but may be realized in the form of a polygon with a smaller length than the length L1 of the first bridge pattern 521 and a larger width than the width W1 of the first bridge pattern 521, a circle, or an ellipse.

The both ends 52a of the first coupling pattern 52 having the above structure contact protrusions 50a of the adjacent first sensing cells 50 as illustrated. Therefore, the first sensing cells 50 arranged in the same line (for example, a row line) in the first direction are electrically coupled to each other through the first coupling pattern 52.

At this time, the protrusions 50a of the first sensing cells 50 may be realized by laminating the transparent conductive layers 510 and the opaque metal layers 520 or may be realized only by the transparent conductive layers 510 or the opaque metal layers 520.

In addition, the second coupling pattern 62 is formed on the insulating layer 80 formed on the first coupling pattern 52 and the second sensing cells 60 integrated with the second coupling pattern 62, that is, the second sensing cells 60 arranged in the same line (for example, a column line) in the second direction are electrically coupled to each other.

That is, since the second coupling patterns 62 are integrated with the second sensing cells 60, the second coupling patterns 62 may be realized by laminating transparent conductive layers 610' and opaque metal layers 620'.

In the bridge pattern according to the embodiment of the present invention, that is, in the first coupling pattern 52, even when positions of the protrusions 50a formed of only the opaque metal layers of the first sensing cells 50 are shifted by the first bridge pattern 521 with the large width W1 due to the align allowance, a margin of the width W1 by which the protrusions 50a of the first sensing cells may contact the ends 52a of the first coupling pattern may be secured.

In the embodiment of FIGS. 2A and 2B, the protrusions 50a of the first sensing cells 50 are positioned at the center of the first coupling pattern 52 to be electrically coupled to the second bridge pattern 522. However, the embodiment of the present invention is not limited to the above. That is, although the positions of the protrusions 50a of the first sensing cells are shifted due to the align allowance, the protrusions 50a of the first sensing cells may contact the first bridge pattern 521.

In addition, a drawback in which the first bridge pattern 521 is formed of a transparent conductive material to have high surface resistance is overcome by the second bridge pattern 522 formed of an opaque metal to be laminated on the first bridge pattern 521.

That is, the first sensing cells 50 may be electrically coupled to the first bridge pattern 521. However, a sensing signal between the first sensing cells 50 is transmitted through the second bridge pattern 522 with low resistance so that it is possible to prevent a defective operation from being caused by the high surface resistance of the first bridge pattern 521.

In addition, when the width W1 of the first bridge pattern 521 is determined, since it is necessary to consider only the align allowance and it is not necessary to consider the surface resistance, the width of the bridge pattern may be reduced in comparison with that of the bridge pattern formed of the transparent conductive material. Therefore, the width of the insulating layer 80 may be reduced.

In addition, the width W2 of the second bridge pattern 522 may be reduced in comparison with that of the bridge pattern formed of only the opaque metal since it is not necessary to consider the align allowance. Therefore, it is possible to prevent the second bridge pattern 522 from being visible.

Figure 3:
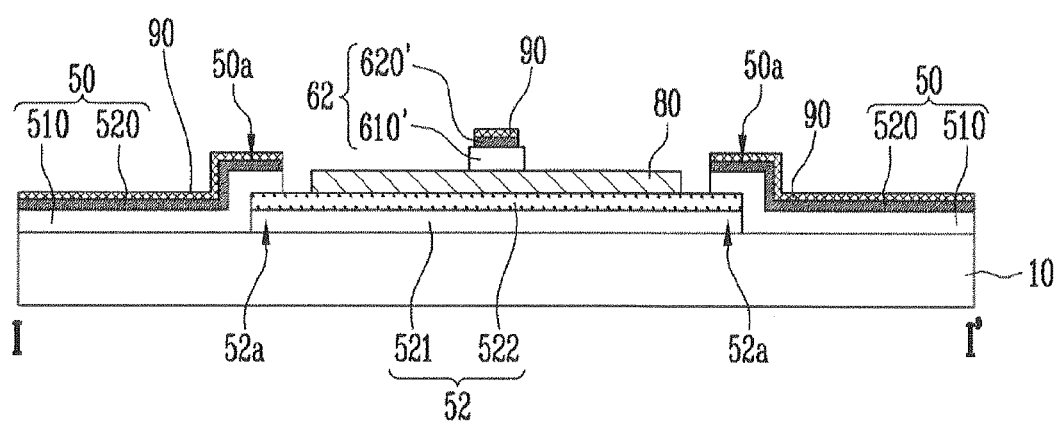
FIG. 3 is a cross-sectional view of a specific region A of FIG. 1 taken along line I-I' of FIG. 2A according to another embodiment of the present invention.

FIG. 3 is a cross-sectional view of the specific region A of FIG. 1 taken along line I-I' of FIG. 2A according to another embodiment of the present invention.

The embodiment illustrated in FIG. 3 is the same as that illustrated in FIG. 2B except that the colored photoresists 90 are further formed on regions that overlap the opaque metal layers 520, 620, and 620' of which the first and second sensing cells 50 and 60 and the second coupling patterns 62 are formed. In one embodiment, the colored photoresists 90 cover the entirety of the opaque metal layers 520, 620, and 620'. Therefore, the same elements are denoted by the same reference numerals and description thereof will be omitted.

In reference to FIG. 3, the colored photoresists 90 are further formed on the opaque metal layers 520, 620, and 620' of which the first and second sensing cells 50 and 60 and the second coupling patterns 62 are formed.

In the opaque metal layers 520, 620, and 620', unique metal reflection glossiness and surface reflectance are increased so that a user may recognize the metal and it is difficult to realize a high definition product.

In order to solve the problem, a polarizing film (not shown) may be formed on the substrate 10 where the sensing cells 50 and 60 are formed. However, although the polarizing film is formed, the opaque metal layer may be recognized.

Therefore, according to the embodiment of the present invention, the colored photoresists 90 are formed on the opaque metal layers 520, 620, and 620' of which the first and second sensing cells and the second coupling patterns are formed. Since the colored (for example, black) photoresists 9 absorb incident light, the colored photoresists 9 are formed on the opaque metal layers 520, 620, and 620' to remarkably reduce reflectance of external light.

In addition, since the photoresists 90 may be used for a process of patterning the mesh-shaped opaque metal layers 520, 620, and 620' and may function as insulating layers, an additional mask process of forming the insulating layers is not necessary.

By way of summation and review, The electro-capacitive touch screen panel is commonly attached to the external surface of the image display device such a liquid crystal display device (LCD) and an organic light emitting display device (OLED) to be produced. Therefore, the touch screen panel requires high transparency and thin film characteristics.

In the contemporary touch screen panel, since thin film and pattern forming processes are required to form the sensing cells, high thermal and chemical resistances are required. Therefore, the sensing cells are formed on a glass substrate suitable for the process characteristics.

However, in this case, since the glass substrate must have a thickness of no less than a uniform value so that the glass substrate may be returned in the processes, the thin film characteristic is not satisfied and a flexible characteristic may not be realized.

As set forth above, in the touch screen panel according to an embodiment of the present invention, in the touch screen panel in which the sensing cells as the touch sensors are formed on one surface of the substrate, the sensing cells are realized by laminating the transparent conductive layers and mesh-shaped opaque metal layers. Therefore, the uniform distribution of the electric field may be secured when the large area touch screen panel is realized and the operation may be performed although short is partially generated in the mesh-shaped opaque metal layers.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch screen panel, comprising:
   a substrate;
   first sensing cells disposed on a surface of the substrate and arranged in a first direction and second sensing cells disposed on the surface of the substrate and arranged in a second direction that intersects the first direction; and
   first coupling patterns configured to couple the first sensing cells in the first direction and second coupling patterns configured to the second sensing cells in the second direction,
   with the first and second sensing cells formed by laminating transparent conductive layers and mesh-shaped opaque metal layers.

2. The touch screen panel as claimed in claim 1, wherein the transparent conductive layers include at least one of indium tin oxide (ITO), carbon nanotube (CNT), and graphene.

3. The touch screen panel as claimed in claim 1, wherein the opaque metal layers include at least one low resistance metal of Ag, Al, Cu, Cr, and Ni.

4. The touch screen panel as claimed in claim 1,
   wherein the transparent conductive layers are patterned on the substrate, and
   wherein the mesh-shaped opaque metal layers are formed on top surfaces of the patterned transparent conductive layers in frames of the patterned transparent conductive layers.

5. The touch screen panel as claimed in claim 1, wherein the substrate is a low retardation film and includes at least one of a casted polycarbonate (PC) film and a cyclic polyolefin (COP) film.

6. The touch screen panel as claimed in claim 1, wherein the substrate includes at least one of a PC film, an oriented poly propylene (OPP) film, and a poly vinyl alcohol (PVA) film having a phase difference function.

7. The touch screen panel as claimed in claim 1,
   wherein colored photoresists are further formed on regions that overlap the opaque metal layers of which the first and second sensing cells are formed.

8. The touch screen panel as claimed in claim 1,
   wherein the first coupling patterns are formed in a form of bridges, and
   wherein the second coupling patterns are formed simultaneously together with the second sensing cells as a single integral and monolithic and continuous structure.

9. The touch screen panel as claimed in claim 8, wherein each of the first coupling patterns comprises:
   a first bridge pattern formed of a transparent conductive material with a first width; and
   a second bridge pattern laminated on the first bridge pattern and formed of an opaque metal with a second width.

10. The touch screen panel as claimed in claim 9, wherein an island-shaped insulating layer is formed on one surface of the first coupling pattern with a lamination structure of the first and second bridge patterns to expose both ends of the first coupling pattern.

11. The touch screen panel as claimed in claim 10, wherein a length of the insulating layer is smaller than that of the first bridge pattern and a width of the insulating layer is larger than that of the first bridge pattern.

12. The touch screen panel as claimed in claim 11, wherein both ends of the first coupling pattern physically contact protrusions of adjacent first sensing cells.

* * * * *